(12) United States Patent
Ito et al.

(10) Patent No.: US 9,981,613 B2
(45) Date of Patent: May 29, 2018

(54) HEADREST AND VEHICLE SEAT WITH INTEGRATED SPEAKERS

(71) Applicant: TACHI-S CO., LTD., Akishima-shi, Tokyo (JP)

(72) Inventors: Yasuyuki Ito, Akishima (JP); Takahiko Nagasawa, Akishima (JP); Naoki Takada, Saitama (JP); Fumiaki Nakashima, Saitama (JP); Takao Ishikawa, Saitama (JP)

(73) Assignee: TACHI-S CO., LTD., Akishima-Shi, Tokyo (JP)

( * ) Notice: Subject to any disclaimer, the term of this patent is extended or adjusted under 35 U.S.C. 154(b) by 0 days. days.

(21) Appl. No.: 15/120,085

(22) PCT Filed: May 25, 2015

(86) PCT No.: PCT/JP2015/064977
§ 371 (c)(1),
(2) Date: Aug. 18, 2016

(87) PCT Pub. No.: WO2016/031325
PCT Pub. Date: Mar. 3, 2016

(65) Prior Publication Data
US 2017/0072869 A1 Mar. 16, 2017

(30) Foreign Application Priority Data
Aug. 25, 2014 (JP) .................. 2014-170112

(51) Int. Cl.
*H04B 1/00* (2006.01)
*B60R 11/02* (2006.01)
(Continued)

(52) U.S. Cl.
CPC ........ *B60R 11/0217* (2013.01); *B60N 2/4876* (2013.01); *H04R 1/025* (2013.01);
(Continued)

(58) Field of Classification Search
CPC ... H04R 2499/13; H04R 1/02; B60R 11/0217; B60R 2011/0017
(Continued)

(56) References Cited

U.S. PATENT DOCUMENTS 4,944,992 A 7/1990 Yoneshige et al.
7,070,232 B2 7/2006 Minegishi et al.
(Continued)

FOREIGN PATENT DOCUMENTS

EP 0337113 A1 10/1989
EP 1389558 A1 2/2004
(Continued)

OTHER PUBLICATIONS

International Search Report in PCT/JP2015/064977 dated Jul. 7, 2015 (English Translation Thereof).
(Continued)

*Primary Examiner* — Alexander Jamal
(74) *Attorney, Agent, or Firm* — McGinn IP Law Group, PLLC.

(57) ABSTRACT

To prevent a person from experiencing discomfort when touching portions of a headrest having built-in speakers; to enable the headrest to be formed compactly by arranging the speakers close to the body of the person; and to prevent any decrease in the acoustic pressure and/or acoustic quality of sound from the speakers. Provided are: a plurality of speakers 25a, 25b; fiber pads 15 provided to the front surfaces of the speakers 25a, 25b; a sound-insulating pad 16 provided between the fiber pads 15; and a surface skin 9 for covering the speakers 25a, 25b, the fiber pads 15, and the sound-insulating pad 16, the fiber pads 15 being formed from an elastic material that has a three-dimensional-mesh structure therein, and the sound-insulating pad 16 being formed from an elastic material for minimizing the transmission of sound.

7 Claims, 11 Drawing Sheets

(51) Int. Cl.
*B60N 2/48* (2006.01)
*H04R 1/02* (2006.01)
*H04R 5/02* (2006.01)
*B60R 11/00* (2006.01)

(52) U.S. Cl.
CPC ...... *H04R 5/023* (2013.01); *B60N 2002/4888* (2013.01); *B60R 2011/0017* (2013.01); *H04R 2499/13* (2013.01)

(58) Field of Classification Search
USPC ............................ 381/86, 337, 345, 354, 389
See application file for complete search history.

(56) References Cited

U.S. PATENT DOCUMENTS

| 7,159,938 | B1 | 1/2007 | Shiraishi |
| 2004/0104607 | A1 | 6/2004 | Minegishi et al. |
| 2007/0024097 | A1 | 2/2007 | Shiraishi |
| 2011/0174926 | A1* | 7/2011 | Margis ................. B60N 2/4876 244/118.6 |
| 2016/0039320 | A1* | 2/2016 | Subat ................... B60N 2/4876 297/217.5 |
| 2017/0251287 | A1* | 8/2017 | Oswald .................. H04R 1/025 |

FOREIGN PATENT DOCUMENTS

| JP | H04-104948 U | 9/1992 |
| JP | H05-262184 A | 10/1993 |
| JP | H06-86612 U | 12/1994 |
| JP | 2005-323798 A | 11/2005 |
| JP | 2009-247388 A | 10/2009 |
| JP | 2009-291454 A | 12/2009 |
| JP | 2014-079318 A | 5/2014 |
| WO | WO 93/01951 | 2/1993 |

OTHER PUBLICATIONS

Chinese Office Action dated Jun. 22, 2017 in Chinese Application No. 201580011541.7.
Supplementary European Search Report dated Mar. 14, 2017 in European Application No. 15836059.

* cited by examiner

HEADREST AND VEHICLE SEAT WITH INTEGRATED SPEAKERS

TECHNICAL FIELD

The present invention relates to a headrest with which the rear of the head of a sitter sitting in a vehicle seat comes into contact. The present invention also relates to a vehicle seat in which an occupant riding in a vehicle sits.

BACKGROUND ART

Conventionally, there are known headrests for vehicle seats in which speakers are installed in lateral positions located on the left and right of a portion with which the head of an occupant comes into contact (see, e.g., Patent Citation 1 (Japanese Unexamined Utility Model Publication No. H4-104948)). It is also conventionally known for speakers to be installed in the upper part of the seat back of a vehicle seat, at lateral positions to the left and right of the neck of the occupant (see, e.g., Patent Citation 2 (Japanese Unexamined Utility Model Publication No. H6-086612)).

However, in the headrest in Patent Citation 1, since the entire speaker is large, a problem is presented in that visibility from the rear is obstructed by the headrest. Additionally, in the vehicle seat in Patent Citation 2, although there is no obstacle while an occupant is sitting in a prescribed position, a problem is presented in that the occupant might experience discomfort due to their body touching a hard framework present around the speakers when sitting down on the seat, getting up from the seat, subjected to violent rocking motion, or in other events.

In order to overcome the problems described above, headrests have been considered in which urethane pads are arranged in front of the speakers, in lieu of the framework. According to this configuration, the occupant experiences no discomfort relating to hardness even when touching portions in which the urethane pads are placed; therefore, an advantage is presented in that the speakers can be arranged close to the body of the individual, wherefore the headrests and other components can be formed compactly.

However, urethane pads have a property that inhibits sound from being readily transmitted, presenting a problem in that it is difficult for the occupant to hear sound from the speaker in cases in which urethane pads are placed in front of the speakers. Reducing the thickness of the urethane pads makes it possible to hear sound at a given acoustic pressure, even in cases in which speakers are placed on the reverse side of the urethane pads; however, in such a case, another problem is presented in terms of limited function for holding the head and/or body of the occupant.

CITATION LIST

Patent Literature

Patent Citation 1: Japanese Unexamined Utility Model Publication No. H4-104948
Patent Citation 2: Japanese Unexamined Utility Model Publication No. H6-086612

SUMMARY OF INVENTION

Technical Problem

In view of the problems described above in conventional devices, it is an objective of the present invention to provide a headrest and a vehicle seat with which it is possible to: prevent an occupant from experiencing discomfort in the vehicle seat when touching portions of the headrest and/or seat having built-in speakers; enable the headrest and/or seat to be formed compactly by arranging the speakers close to the body of the occupant; and prevent any decrease in the acoustic pressure and/or acoustic quality of sound from the speakers.

Solution to Problem

The headrest according to the present invention comprises: a plurality of speakers; fiber pads provided to the front surfaces of each of the speakers; a sound-insulating pad provided between the fiber pads; and a surface skin for covering the speakers, the fiber pads, and the sound-insulating pad, the fiber pads being formed from an elastic material that has a three-dimensional-mesh structure therein, and the sound-insulating pad being formed from an elastic material for minimizing the transmission of sound.

The "fiber pads comprising an elastic material that has a three-dimensional-mesh structure therein" (also referred to as a "three-dimensional-mesh-shape fiber pad" below) described above comprise a material having, e.g., the following properties:

(1) Elasticity; i.e., the material yields when pressed, and returns to its original shape when the pressing is stopped.

(2) A configuration such that fiber-form resins are three-dimensionally intertwined, whereby multiple interior spaces are retained and the total volume of the interior spaces is greatly increased. Therefore, the three-dimensional-mesh-shape fiber pads can transmit sound without any decrease in the acoustic pressure and acoustic quality.

(3) A pad shape; i.e., the shape of a pad, mat, or plate.

(4) Softness, but enough hardness to be capable of retaining an overall shape.

(5) A thickness of 10-40 mm, and preferably 20-40 mm, in a state of rest.

(6) When sandwiched and pressed between the hands of an adult, a compressed thickness amounting to $2/3$-$1/2$ of the original thickness. When the pressing force is released, the thickness of the material naturally recovers to the original state after a relatively short period of time.

The "elastic material for minimizing the transmission of sound" described above may be any material that has elastic properties and is capable of minimizing the amount of sound transmitted. Examples of such a material include urethane, which is a foamed material.

In the headrest according to the present invention, the plurality of speakers can be provided so as to be laterally divided in relation to a central axis of the headrest, the central axis extending vertically. The sound-insulating pad can be provided in a central region of the headrest, between the laterally divided plural speakers.

According to this configuration, sound can be transmitted to the left ear of an occupant from a left-side speaker, and can be transmitted to the right ear of the occupant from a right-side speaker. The action of the sound-insulating pad makes it possible to clearly separate right-channel sound and left-channel sound.

In the headrest according to the present invention, the sound-insulating pad can be shaped so as to spread laterally in a direction from a location near the plurality of speakers toward a location away from the plurality of speakers. This makes it possible to transmit the sound emitted from the speakers toward the outer side of the headrest.

In the headrest according to the present invention, the surface skin for covering the fiber pads is preferably formed from a material that readily transmits sound. This makes it possible to prevent the volume of the sound from the speakers installed inside the headrest from being attenuated by the surface skin.

In the headrest according to the present invention, the surface skin can be formed from a three-dimensional net material or a material containing punched leather. According to this configuration, it is possible to prevent the sound emitted from the speakers inside the headrest from being attenuated by the surface skin.

Next, a first vehicle seat according to the present invention has: a seat cushion, which is a portion on which an occupant sits; a seat back, which is a portion with which the back of the occupant comes into contact; and a headrest, which is a portion with which the head of the occupant comes into contact, the headrest being mounted on the seat back, wherein the headrest is configured as described above.

In the first vehicle seat, the present invention is applied to the headrest. According to this vehicle seat, it is possible to similarly obtain the effects obtained in the headrest according to the present invention.

Next, a second vehicle seat according to the present invention has: a seat cushion, which is a portion on which an occupant sits; a seat back, which is a portion with which the back of the occupant comes into contact; and a headrest, which is a portion with which the head of the occupant comes into contact, the headrest being mounted on the seat back, wherein the seat back and/or the seat cushion comprises: a plurality of speakers; fiber pads provided to the front surfaces of each of the speakers; a sound-insulating pad provided between the fiber pads; and a surface skin for covering the speakers, the fiber pads, and the sound-insulating pad, the fiber pads being formed from an elastic material that has a three-dimensional-mesh structure therein, and the sound-insulating pad being formed from an elastic material for minimizing the transmission of sound.

In the second vehicle seat, the present invention is applied to at least one of the seat back and the seat cushion. According to this vehicle seat, it is possible to similarly obtain the effects obtained in the headrest according to the present invention.

Advantageous Effects of Invention

In the headrest according to the present invention, the following effects can be obtained.

(1) Since the fiber pads are arranged on the front surface of the speakers, and have multiple interior spaces present in three dimensions, it is possible to prevent any decrease in the acoustic pressure and/or acoustic quality of the sound from the speakers, and to successfully transmit the sound emitted from the speakers to the occupant.

(2) Suitably adjusting the shape and arrangement position of the fiber pads, as well as the shape and arrangement position of the sound-insulating pad, makes it possible to direct the sound emitted from the plurality of speakers toward a desired direction. Specifically, a duct structure of the speakers can be configured by combining the fiber pads and the sound-insulating pad, the duct structure making it possible to impart directionality to the sound emitted from the speakers.

(3) Because the sound-insulating pad is provided between plural fiber pads, it is possible to prevent the sounds emitted from the plurality of speakers from interfering with each other. Therefore, a high degree of separation is maintained between the sounds emitted from the plurality of speakers. Therefore, it is possible to provide clear and high-quality sound without cloudiness to the occupant.

(4) Since each of the fiber pads and the sound-insulating pad is elastic, it is possible to cushion a person, hold the head and/or body of the person, and protect the speakers from impact.

(5) Since each of the fiber pads and the sound-insulating pad is elastic, the hard portions of the speakers do not directly come into contact with the head of the occupant, even in cases when the speakers are arranged on the reverse side in the immediate vicinity of the fiber pads and sound-insulating pad. Additionally, arranging the speakers on the reverse side in the immediate vicinity of the fiber pads and sound-insulating pad makes it possible to form the headrest having built-in speakers so as to be extremely compact.

In the vehicle seat according to the present invention, the same effects can be achieved as in the headrest according to the present invention.

DESCRIPTION OF EMBODIMENTS

Figure 1:
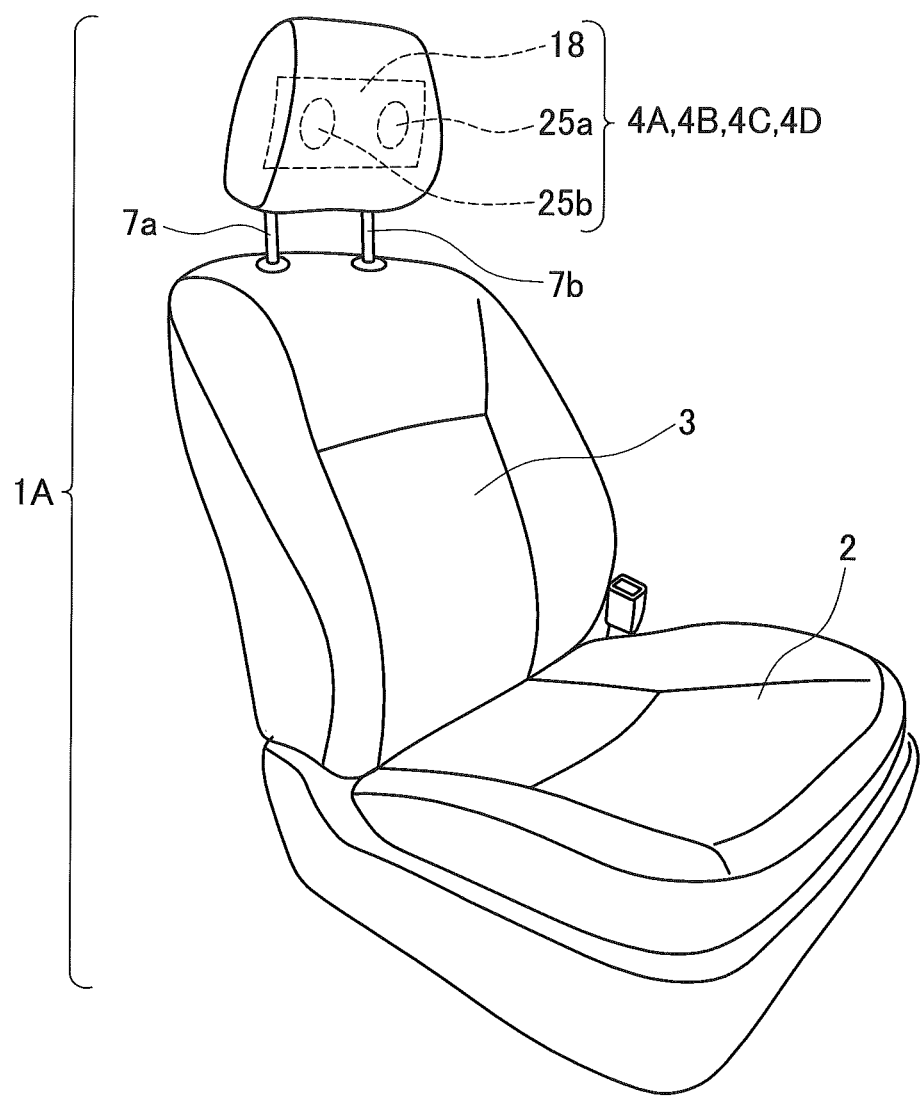
FIG. 1 is a perspective view of an embodiment of a headrest and vehicle seat according to the present invention.

Embodiments of a headrest and a vehicle seat according to the present invention are described below. It shall be apparent that the present invention is not limited to these embodiments. Additionally, there shall be cases in which structural elements in the drawings annexed to the present specification are illustrated using proportions different from those in actual use, in order to facilitate understanding of the characteristic portions.

First Embodiment of Headrest and Vehicle Seat

FIG. 1 shows embodiments of a headrest and a vehicle seat according to the present invention. The vehicle seat 1A shown here is one of a plurality of seats installed inside an automobile, which is one type of vehicle. The vehicle seat 1A has: a seat cushion 2, which is a portion on which an occupant sits; a seat back 3, which is a portion with which the back of the occupant comes into contact; and a headrest 4A mounted on the seat back 3.

Figure 2:
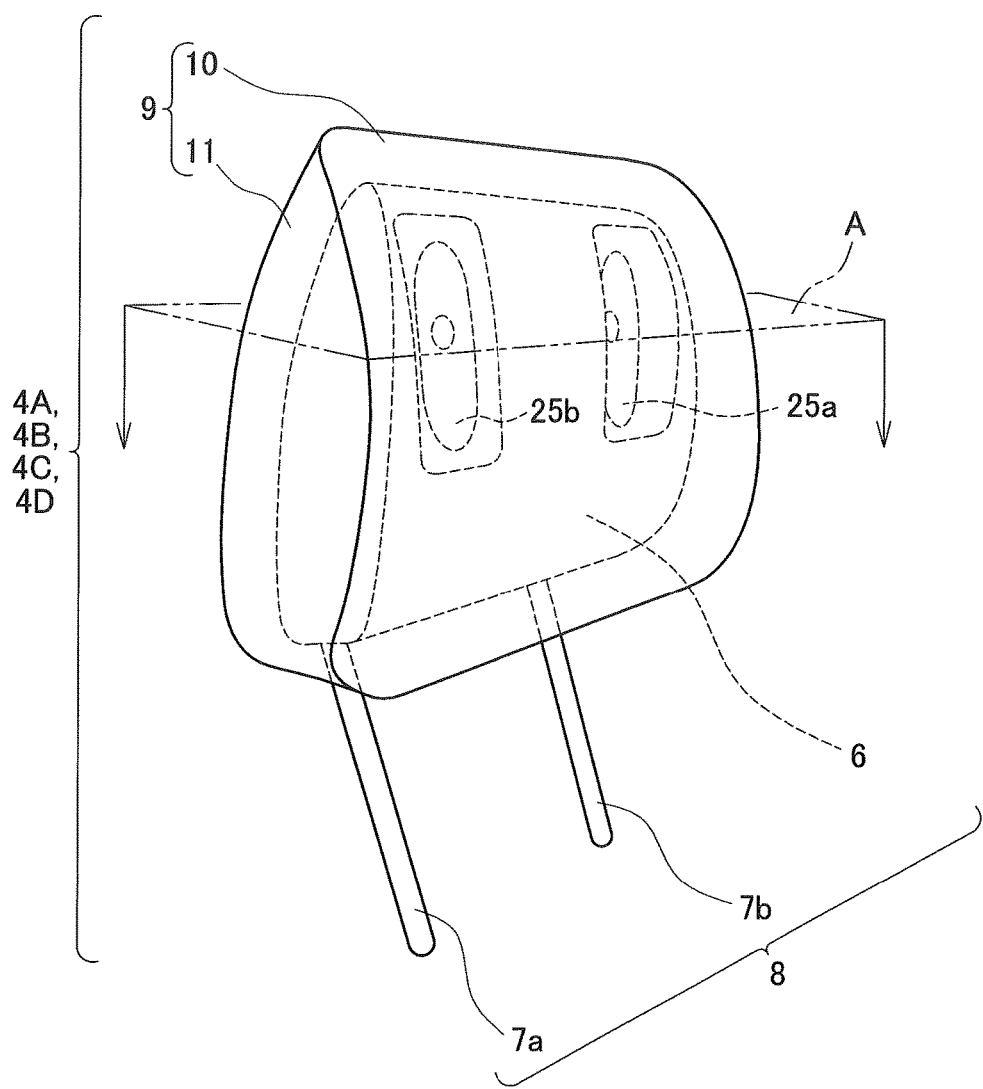
FIG. 2 is a perspective view of the headrest, which is a structural element of the vehicle seat in FIG. 1.
Figure 3:
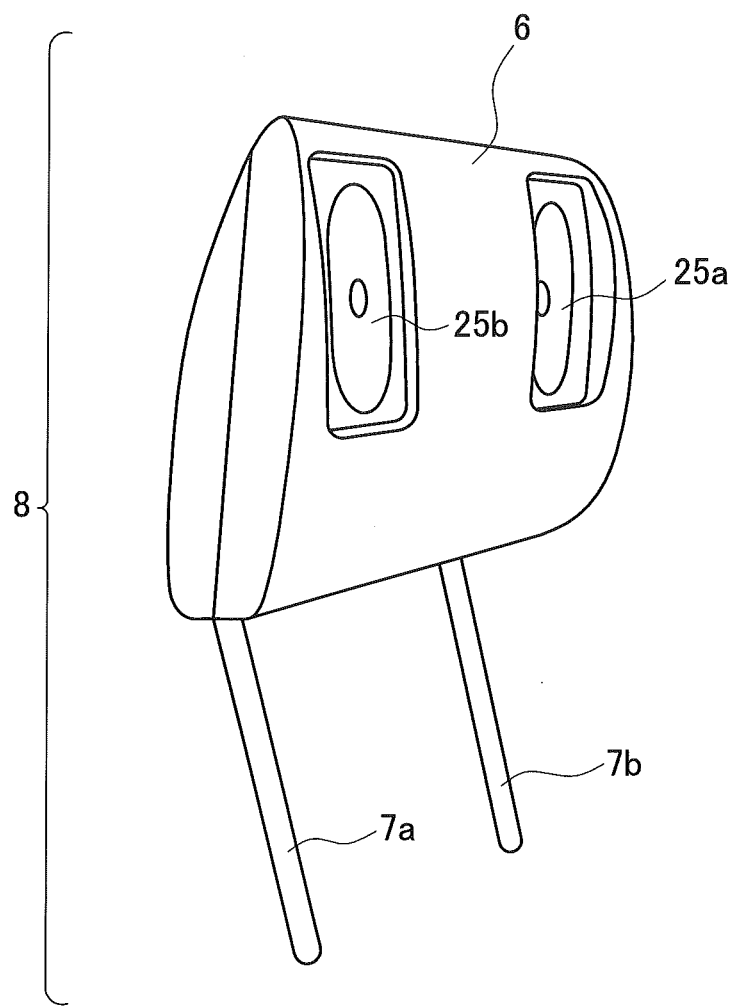
FIG. 3 is a perspective view of a headrest frame which is a structural element of the headrest in FIG. 2.

The headrest 4A has a headrest frame 8 and a surface skin 9, as shown in FIG. 2. The headrest frame 8 has a core 6 and pillar frames 7a, 7b, as shown in FIG. 3. The core 6 may be a unitary box-type member, or a two-block structure formed by joining a front-side core and a rear-side core. The interior of the core 6 is a hermetically sealed space. The core 6 is formed from a hard resin; e.g., polypropylene (PP) or ABS resin.

In FIG. 2, the surface skin 9 is formed by stitching together a front-side surface skin 10 and a rear-side surface skin 11. An opening is formed in the bottom of the surface skin 9. The core 6 of the headrest frame 8 is inserted into the interior of the surface skin 9 from the opening in the bottom of the surface skin 9, whereby the core 6 is covered by the surface skin 9. The pillar frames 7a, 7b extend to the exterior of the surface skin 9. In FIG. 1, the pillar frames 7a, 7b are placed in holes provided in the top of the seat back 3, whereby the headrest 4A is mounted on the seat back 3.

Figure 4:
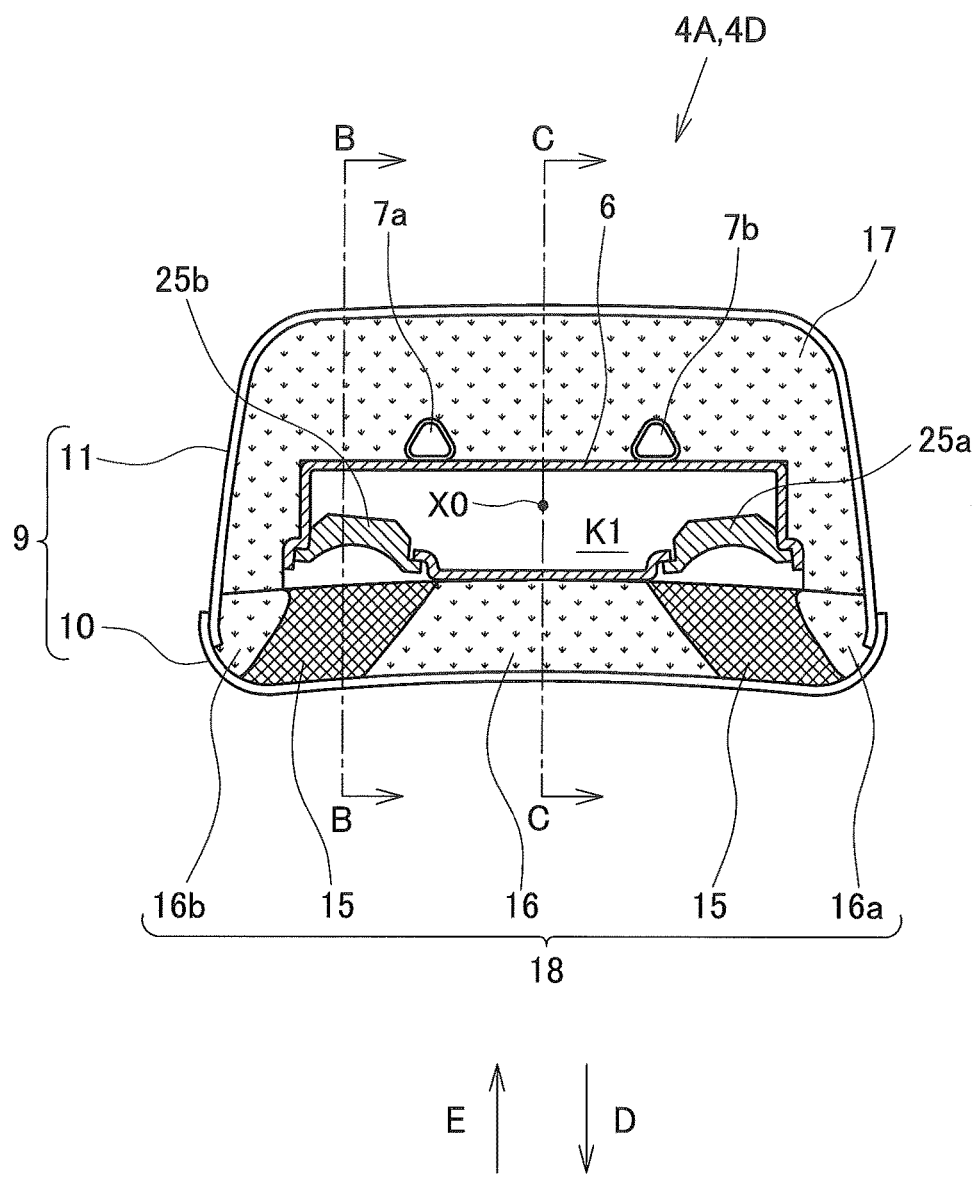
FIG. 4 is a cross-sectional plan view of the headrest, taken along cross-section A in FIG. 2.
Figure 5:
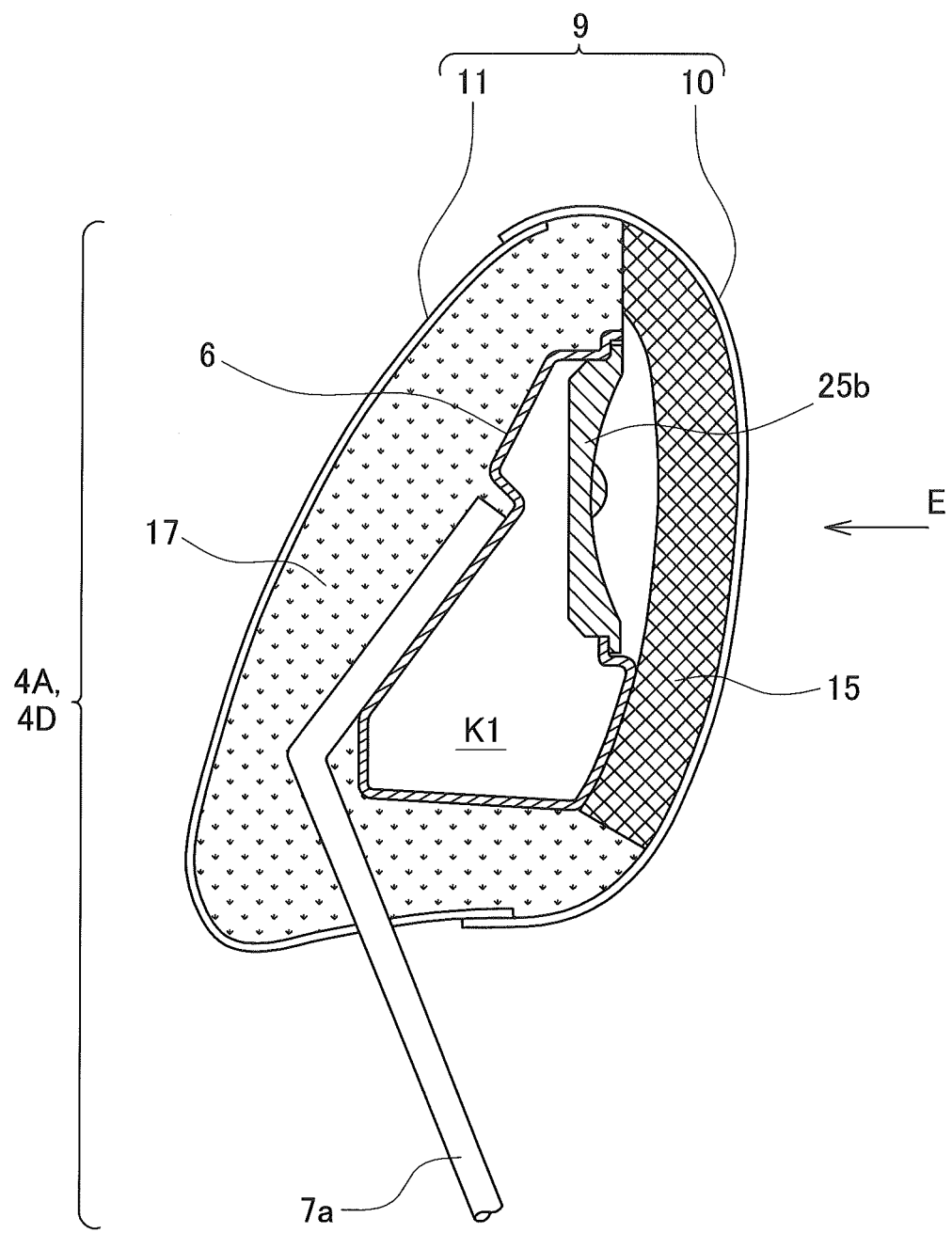
FIG. 5 is a vertical cross-sectional view of the headrest, taken along line B-B in FIG. 4.
Figure 6:
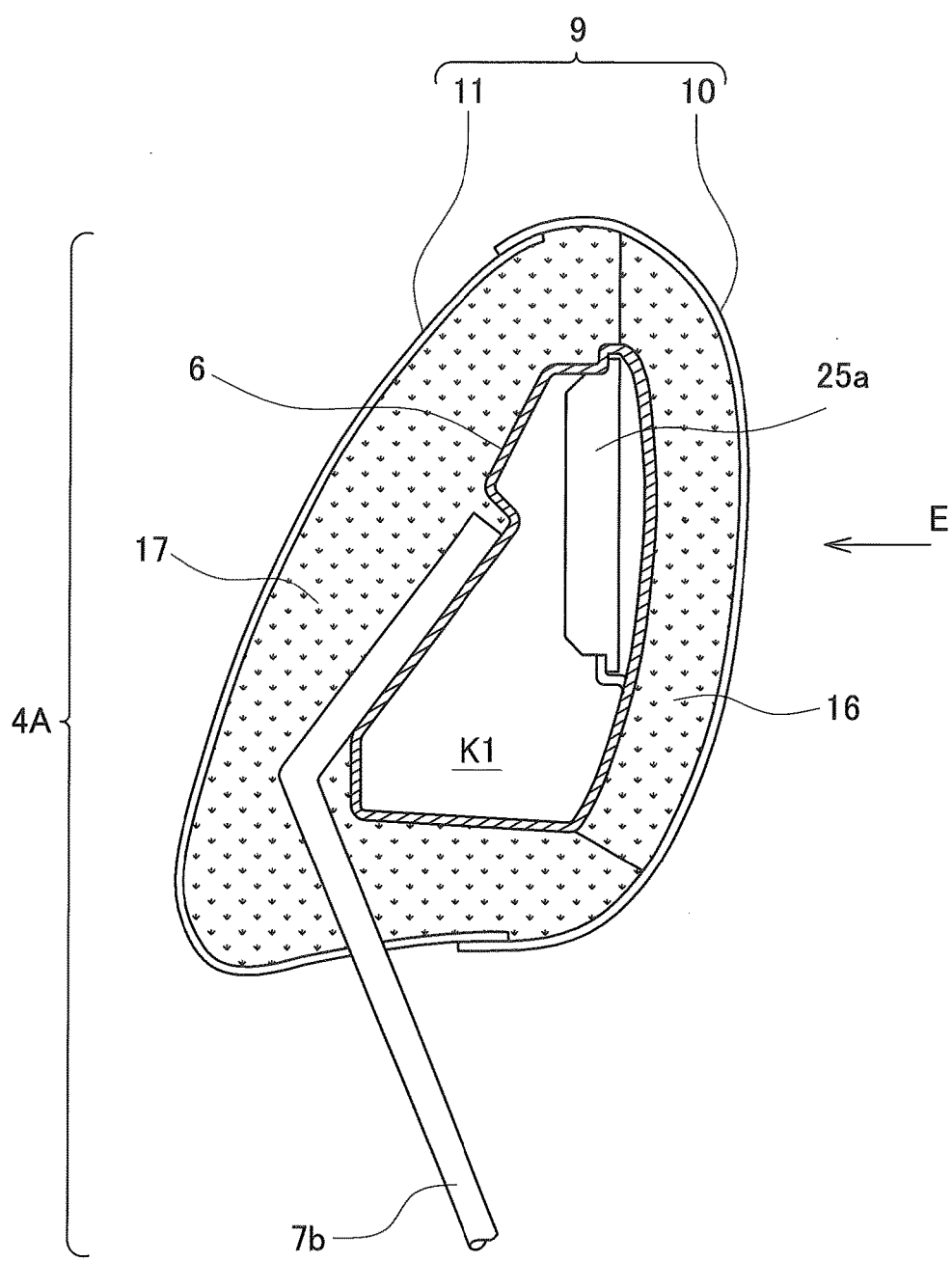
FIG. 6 is a vertical cross-sectional view of the headrest, taken along line C-C in FIG. 4.

FIG. 4 is a cross-sectional plan view of the headrest 4A, taken along cross-section A in FIG. 2. FIG. 5 is a vertical cross-sectional view of the headrest 4A, taken along line B-B in FIG. 4. FIG. 6 is a vertical cross-sectional view of the headrest 4A, taken along line C-C in FIG. 4. In these drawings, the interior of the core 6 is designated as an interior space K1. The pillar frames 7a, 7b are secured to the rear surface of the core 6. A speaker 25a and a speaker 25b are secured to the front surface of the core 6. In the present embodiment, the speakers 25a, 25b are full-range speakers. Other types of speakers, such as woofers, can be provided aside from these speakers as necessary. There are also cases in which three or more speakers are provided.

The core 6 and the interior space K1 are used cooperatively as an enclosure for the speakers 25a, 25b. The enclosure is an acoustic element for preventing the sound emitted from the rear part of the speakers 25a, 25b from interfering with the sound emitted from the front part of the speakers 25a, 25b.

The speaker 25a and the speaker 25b are arranged so as to be laterally divided in relation to the central axis X0 of the headrest 4A in FIG. 4, the central axis X0 being a central axis in a width direction (i.e., lateral direction) of the headrest 4A and extending vertically (i.e., in the direction passing through the plane of the diagram depicted by FIG. 4). A sound-insulating pad 16 is provided in a central region of the headrest 4A, between the speakers 25a, 25b arranged so as to be divided in this manner. The head of an occupant sitting in the vehicle seat 1A in FIG. 1 is present, in a state of rest, in a region corresponding to the sound-insulating pad 16 of FIG. 4. The speakers 25a, 25b are arranged in regions rearward of both ears on the head of the occupant, respectively.

As shall be apparent from FIGS. 5 and 6, fiber pads 15, 15 are formed in a substantially rectangular shape on the front surface of headrest 4A, the long side of rectangular shape extending vertically when viewed from the front as illustrated by arrow E. The sound-insulating pad 16 is provided in a region sandwiched on the left and right by the fiber pads 15, 15. The sound-insulating pad 16 is provided as a member separate from an elastic body 17 arranged in the rear part of the headrest 4A. In FIG. 4, the left and right fiber pads 15, 15 are respectively positioned on the front surfaces of the speaker 25a and the speaker 25b. Sound-insulating pads 16a and 16b are provided on the respective outer sides of the left and right fiber pads 15, 15.

The fiber pads 15 and the sound-insulating pads 16, 16a, 16b constitute a duct structure 18 for directing the sound emitted from the speakers 25a, 25b in a desired direction. The duct structure 18 fulfills a function as an elastic support for supporting the head of the occupant, as well as fulfilling a function as a speaker grill structure, which is a structure for protecting the speakers 25a, 25b.

As shown in FIGS. 4 and 6, the sound-insulating pad 16 has a roughly rectangular shape. The sound-insulating pad 16 additionally has a planar cross-sectional shape extending laterally within the horizontal plane in a direction from a location near the speakers 25a, 25b toward a location away from the speakers 25a, 25b; i.e., the planar cross-sectional shape is trapezoidal, as shown in FIG. 4. The fiber pads 15 on the front surface of the individual speaker 25a and speaker 25b are provided at an incline so as to be directed outward, in accordance with the planar cross-sectional shape of the sound-insulating pad 16.

The elastic body 17 is provided to the rear surface of the core 6. The elastic body 17 is formed from a material that is soft yet provided with a suitable shape-retention function without imparting a hard, metal-like sensation when touched by an occupant. The elastic body 17 is arranged on the rear-surface portion of the headrest 4A, and therefore preferably lacks a function for readily transmitting sound. In the present embodiment, the elastic body 17 is formed from a urethane pad material which is the same as that used in the sound-insulating pad 16.

The surface skin 9 formed by stitching together the front-side surface skin 10 and the rear-side surface skin 11 covers the duct structure 18 located on the front surface of the core 6, as well as the elastic body 17 located on the rear surface and side surfaces of the core 6. Specifically, the front-side surface skin 10 covers the duct structure 18, and the rear-side surface skin 11 covers the elastic body 17. The front-side surface skin 10 is formed from a processed material that readily transmits sound. The rear-side surface skin 11 is formed from a skin, natural or synthetic leather, a stitchable soft synthetic resin, or the like.

The "processed material that readily transmits sound" described above is, e.g., a three-dimensional net material or a material containing punched leather. The "material containing punched leather" is formed by, e.g., bonding urethane to punched leather, and carrying out a hole-forming process (punching process) through the urethane in order to facilitate the transmission of sound. The "three-dimensional net material" is also referred to as a "3D net material." The 3D net material is a material formed into a textile by intertwining fibers so as to be capable of forming a large mesh, rather than a pad-shaped member made from an elastic material having a fine three-dimensional-mesh structure. The 3D net material is capable of transmitting sound through large mesh portions.

The fiber pads 15 are formed from three-dimensional-mesh-shape fiber pads. The three-dimensional-mesh-shape fiber pads have the following properties:

(1) Elasticity; i.e., the material yields when pressed, and returns to its original shape when the pressing is stopped.

(2) A configuration such that fiber-form resins are three-dimensionally intertwined, whereby multiple interior spaces are retained and the total volume of the interior spaces is greatly increased. Therefore, the three-dimensional-mesh-shape fiber pads can transmit sound without any decrease in the acoustic pressure and acoustic quality.

(3) A pad shape; i.e., the shape of a pad, mat, or plate.

(4) Softness, but enough hardness to be capable of retaining an overall shape.

(5) A thickness of 10-40 mm, and preferably 20-40 mm, in a state of rest.

(6) When sandwiched and pressed between the hands of an adult, a compressed thickness amounting to ⅔-½ of the original thickness. When the pressing force is released, the thickness of the material naturally recovers to the original state after a relatively short period of time.

As long as three-dimensional-mesh-shape fiber pads are used as the fiber pads 15, the sound emitted from the speakers 25a, 25b can be transmitted forward as shown by arrow D without any decrease in the acoustic pressure or acoustic quality thereof, due to the action of the multiple small interior spaces three-dimensionally present inside the three-dimensional-mesh-shape fiber pads.

The sound-insulating pads 16, 16a, 16b are formed from an elastic material capable of minimizing the transmission of sound. "Minimize," in this sense, means to reduce the amount of sound transmitted, and includes cases in which the transmission of sound is completely blocked at a rate of approximately 100%. Urethane, which is a foamed material, or the like can be applied as such an elastic material.

The fiber pads 15 capable of transmitting sound and the sound-insulating pads 16, 16a, 16b for minimizing sound are arranged on the front surfaces of the speakers 25a, 25b, whereby the duct structure 18 is formed by the fiber pads 15 and sound-insulating pads 16, 16a, 16b. The sound emitted from the speakers 25a, 25b is directed in a prescribed direction by the duct structure 18. In the case of the present embodiment, both the sound-insulating pad 16 and the fiber pads 15 are provided in a shape that increases in lateral width within the horizontal plane further toward the front as shown by arrow D; therefore, the sound emitted from the speakers 25a, 25b advances in a direction laterally outward, rather than merely advancing straight in the forward direction shown by arrow D. Specifically, an outward-spreading directionality is imparted to the sound emitted from the speakers 25a, 25b by the fiber pads 15 and sound-insulating pad 16.

Furthermore, because the sound-insulating pad 16 for minimizing sound is provided between the speaker 25a and the speaker 25b, the sounds emitted from the speakers do not interfere with each other. Therefore, the degree of separation between the sounds emitted from the speakers 25a, 25b is improved, so that clear sound without cloudiness can be provided to the occupant.

Because the headrest 4A according to the present embodiment is configured as described above, the occupant can experience a preferred cushioning effect when the rear of the head of the occupant comes into contact with the front-side surface skin 10 of the surface skin 9 in FIG. 1. Additionally, when voices or music are generated from the speakers 25a, 25b, the occupant can recognize the sound from the speakers 25a, 25b while the rear of the head of the occupant is coming into contact with the surface skin 9.

At this time, the core 6 and the interior space K1 in FIG. 4 cooperatively function as an enclosure, so that desired sound is provided forward of the speakers 25a, 25b. Additionally, because the fiber pads 15 and front-side surface skin 10 provided to the front surface of the speakers 25a, 25b are both formed from a material that readily transmits sound, no obstacle is produced to prevent the occupant from hearing the sound.

According to the present embodiment, because an enclosure for the speakers is formed by the core 6 and the interior space K1, there is no need to provide a dedicated enclosure outside of the headrest 4A. Therefore, speakers can be assembled in a headrest of the same size as a headrest in which no speakers are provided. Additionally, the external appearance of the headrest is not adversely affected, irrespective of whether speakers are provided therein.

In the present embodiment, a hard frame such as is used in conventional speaker grill structures is not used; instead, a speaker grill structure is configured from non-hard fiber pads 15 and sound-insulating pads 16, 16a, 16b. Therefore, it is possible to prevent an occupant in the vehicle seat 1A of FIG. 1 from experiencing discomfort when touching the front surface of the headrest 4A.

Additionally, the fiber pads 15 are formed from non-hard three-dimensional-mesh-shape fiber pads that can transmit sound; therefore, the speakers can be arranged in the immediate vicinity of the head of the occupant, whereby the headrest can be formed compactly.

Additionally, the three-dimensional-mesh-shape fiber pads used in the present embodiment are configured such that fiber-form resins are three-dimensionally intertwined, whereby multiple small interior spaces are retained in a dispersed state and sound-permeability is very high. This enhances the transmission of sound; as a result, the sound emitted from the speakers can be provided to the occupant without any decrease in the acoustic pressure and/or acoustic quality of the sound.

Furthermore, in the prior art, when the direction of the sound emitted from the speakers 25a, 25b is to be adjusted, it would be necessary to change the angle at which the speakers 25a, 25b are attached to the core 6. However, in the present embodiment, the directionality of the sound emitted from the speakers 25a, 25b is adjusted according to the shape and arrangement position of the fiber pads 15 and sound-insulating pad 16; therefore, the directionality of the sound can be adjusted while the angle at which the speakers 25a, 25b are attached to the core 6 is kept constant.

(Modification 1)

In the embodiment described above, the sound-insulating pad 16 is shaped so as to increase in lateral width within the horizontal plane further from the speakers 25a, 25b, as illustrated by the headrest 4A shown in FIG. 4. However, the sound-insulating pad 16 may instead be formed in a shape having a fixed lateral width W0; i.e., a substantially rectangular parallelepiped shape, as illustrated by the headrest 4B shown in FIG. 7. In this case as well, directionality can be imparted to the sound emitted from the speakers 25a, 25b by the duct structure 18 comprising the fiber pads 15 and sound-insulating pads 16, 16a, 16b. Additionally, the sound emitted from the speaker 25a and the sound emitted from the speaker 25b can be prevented from interfering with each other due to the sound-insulating pad 16; as a result, it is possible to retain high performance in regard to separating the sounds on the left and right.

(Modification 2)

Figure 7:
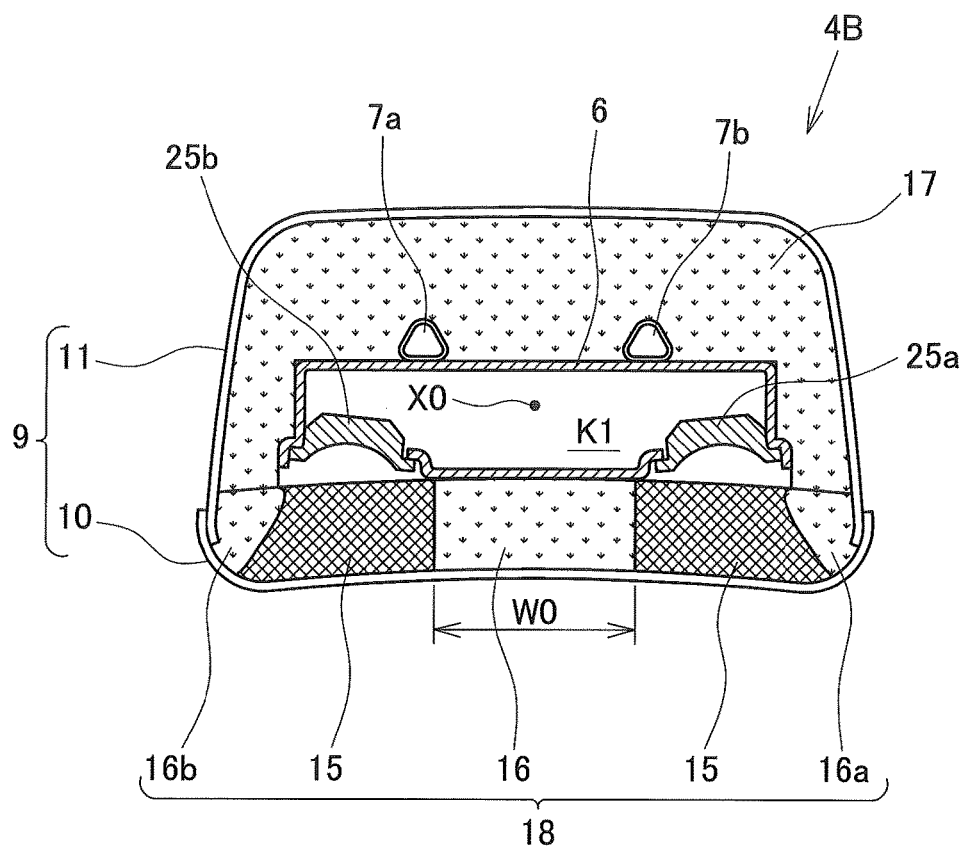
FIG. 7 is a cross-sectional plan view of another embodiment of the headrest according to the present invention.
Figure 8:
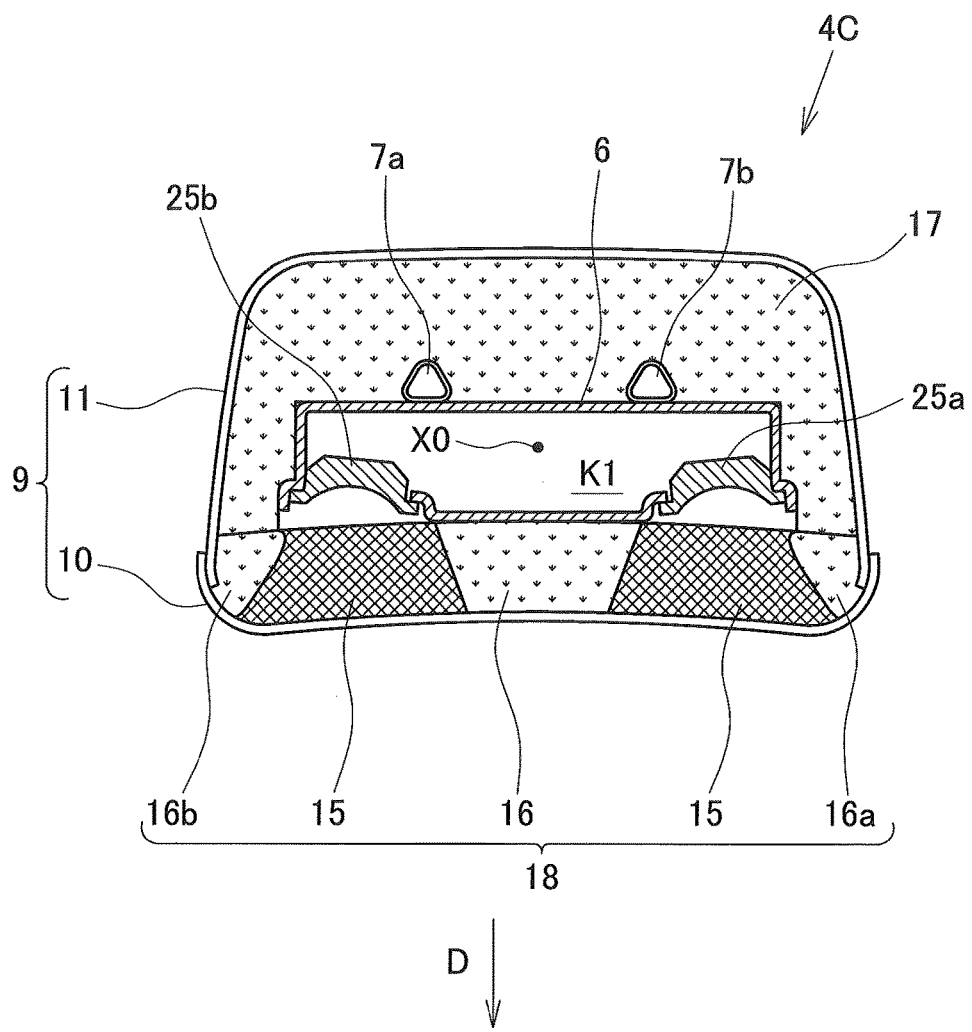
FIG. 8 is a cross-sectional plan view of yet another embodiment of the headrest according to the present invention.

In the embodiment described above, the sound-insulating pad 16 is shaped so as to increase in lateral width within the horizontal plane further from the speakers 25a, 25b as illustrated by the headrest 4A shown in FIG. 4, or is formed in a shape having a fixed lateral width W0, as illustrated by the headrest 4B shown in FIG. 7. However, the sound-insulating pad 16 can instead be shaped so as to taper toward a central portion within the horizontal plane further toward the front as shown by arrow D, as with the headrest 4C shown in FIG. 8. In this case as well, directionality can be imparted to the sound emitted from the speakers 25a, 25b by the duct structure 18 comprising the fiber pads 15 and sound-insulating pads 16, 16a, 16b. Additionally, the sound emitted from the speaker 25a and the sound emitted from the speaker 25b can be prevented from interfering with each other due to the sound-insulating pad 16; as a result, it is possible to retain high performance in regard to separating the sounds on the left and right.

(Modification 3)

Figure 9:
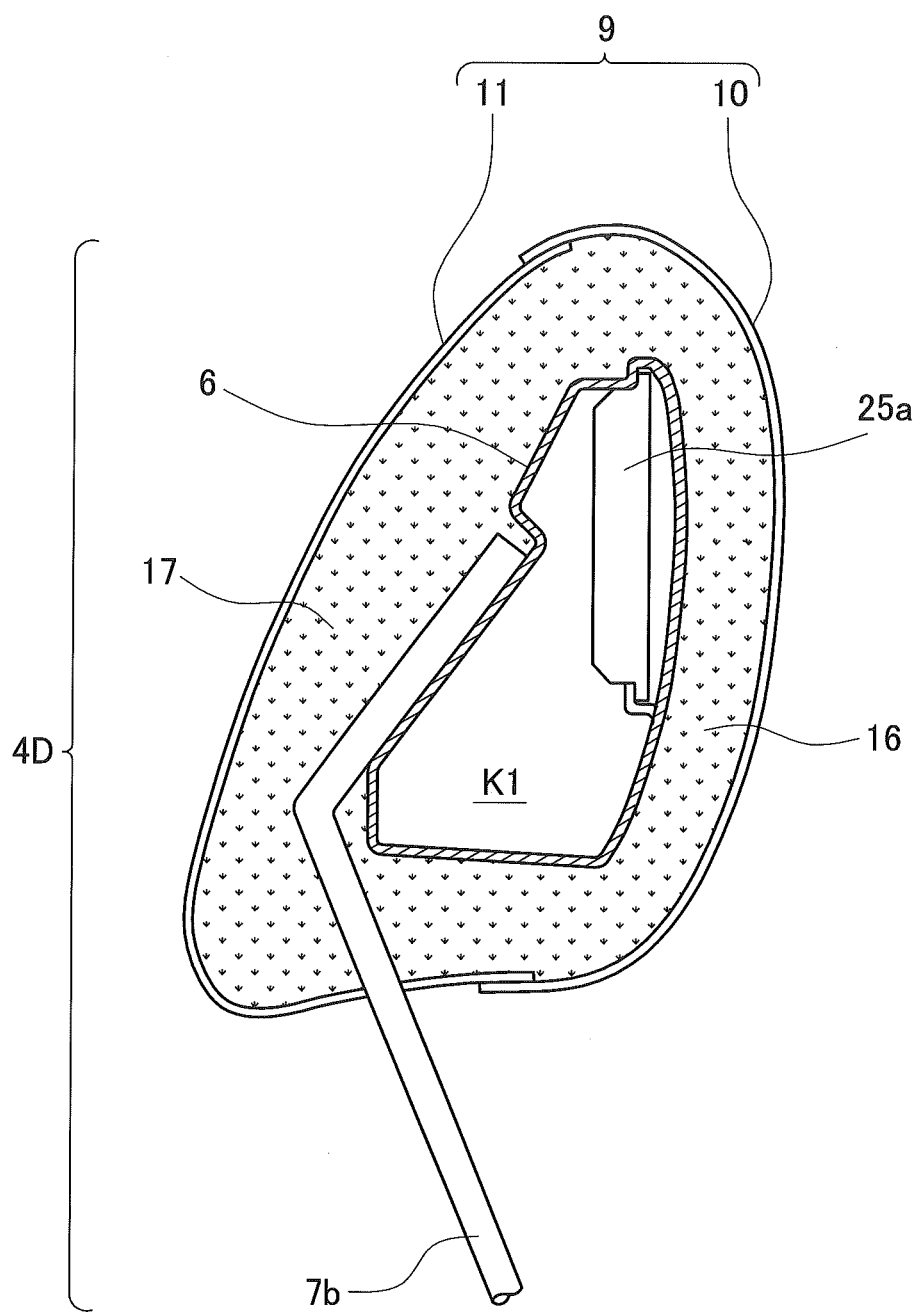
FIG. 9 is a vertical cross-sectional view of yet another embodiment of the headrest according to the present invention.

In the embodiment described above, the duct structure 18 is configured from the substantially rectangular fiber pads 15 and sound-insulating pads 16, 16a, 16b, as shown in FIGS. 4, 5, and 6. However, the duct structure of the present modification, which is configured as shown in FIGS. 4, 5, and 9, can be employed instead. FIG. 9 shows a vertical cross-sectional structure, taken along line C-C in FIG. 4.

The duct structure used in the headrest 4D of the present modification has the fiber pads 15 and sound-insulating pads 16, 16a, 16b, similarly to the duct structure shown in FIGS. 4, 5, and 6. The duct structure of the present modification differs from the duct structure shown in FIGS. 4, 5, and 6 in that the sound-insulating pad 16 sandwiched between the left and right fiber pads 15, 15 is integrated with the elastic body 17 on the rear surface, as shown in FIG. 9. According to the duct structure of the present modification, the effect for minimizing sound using the sound-insulating pad 16 can be enhanced; as a result, the performance in regard to separating the sounds from the speaker 25a and the speaker 25b can be further enhanced.

Second Embodiment of Vehicle Seat

Figure 10:
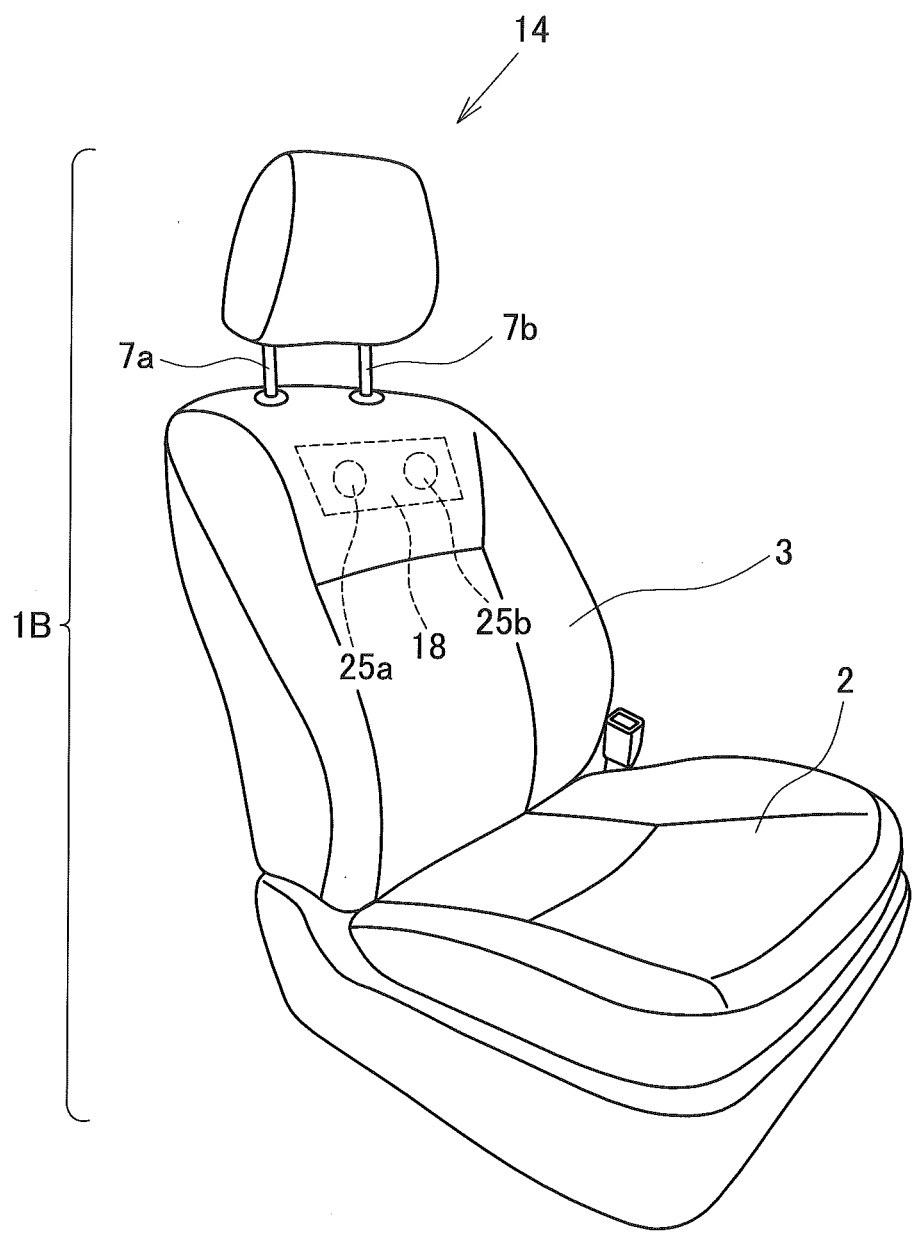
FIG. 10 is a perspective view of another embodiment of the vehicle seat according to the present invention.

FIG. 10 shows another embodiment of the vehicle seat according to the present invention. This vehicle seat 1B has speakers 25a, 25b and a duct structure 18 built into the interior of the upper part of the seat back 3. The duct structure 18 is the same as the duct structure 18 shown in, e.g., FIGS. 4, 5, and 6.

In the present embodiment, a headrest 14 may be the headrest 4A-4D shown in FIG. 1 (i.e., may have speakers and a duct structure), or may have no speakers built in.

In the present embodiment, a hard frame such as is used in conventional speaker grill structures is not used; instead, fiber pads 15 formed from non-hard three-dimensional-mesh-shape fiber pads and a non-hard sound-insulating pad 16 are employed. Therefore, it is possible to prevent an occupant in the vehicle seat 1B from experiencing discomfort of feeling hardness when touching the front surface of the seat back 3.

Additionally, the non-hard fiber pads 15 that can transmit sound and the sound-insulating pad 16 which is a non-hard elastic body are provided to the front surface of the speakers 25a, 25b; therefore, the speakers can be arranged in the immediate vicinity of the body (particularly the shoulders) of the occupant, or on the reverse side of the body, whereby the vehicle seat 1B as an end product can be formed compactly.

Additionally, the three-dimensional-mesh-shape fiber pads used in the present embodiment are configured such that fiber-form resins are three-dimensionally intertwined, whereby multiple small interior spaces are retained in a dispersed state and sound-permeability is very high. This enhances the transmission of sound; as a result, the sound emitted from the speakers can be provided to the occupant without any decrease in the acoustic pressure and/or acoustic quality of the sound.

Additionally, according to the vehicle seat 1B of the present embodiment, directionality can be imparted to the sound emitted from the speakers 25a, 25b by the duct structure 18 (see FIG. 4) comprising the fiber pads 15 and the sound-insulating pads 16, 16a, 16b. Furthermore, the sound emitted from the speaker 25a and the sound emitted from the speaker 25b can be prevented from interfering with each other due to the sound-insulating pad 16; as a result, it is possible to retain high performance in regard to separating the sounds on the left and right.

Third Embodiment of Vehicle Seat

Figure 11:
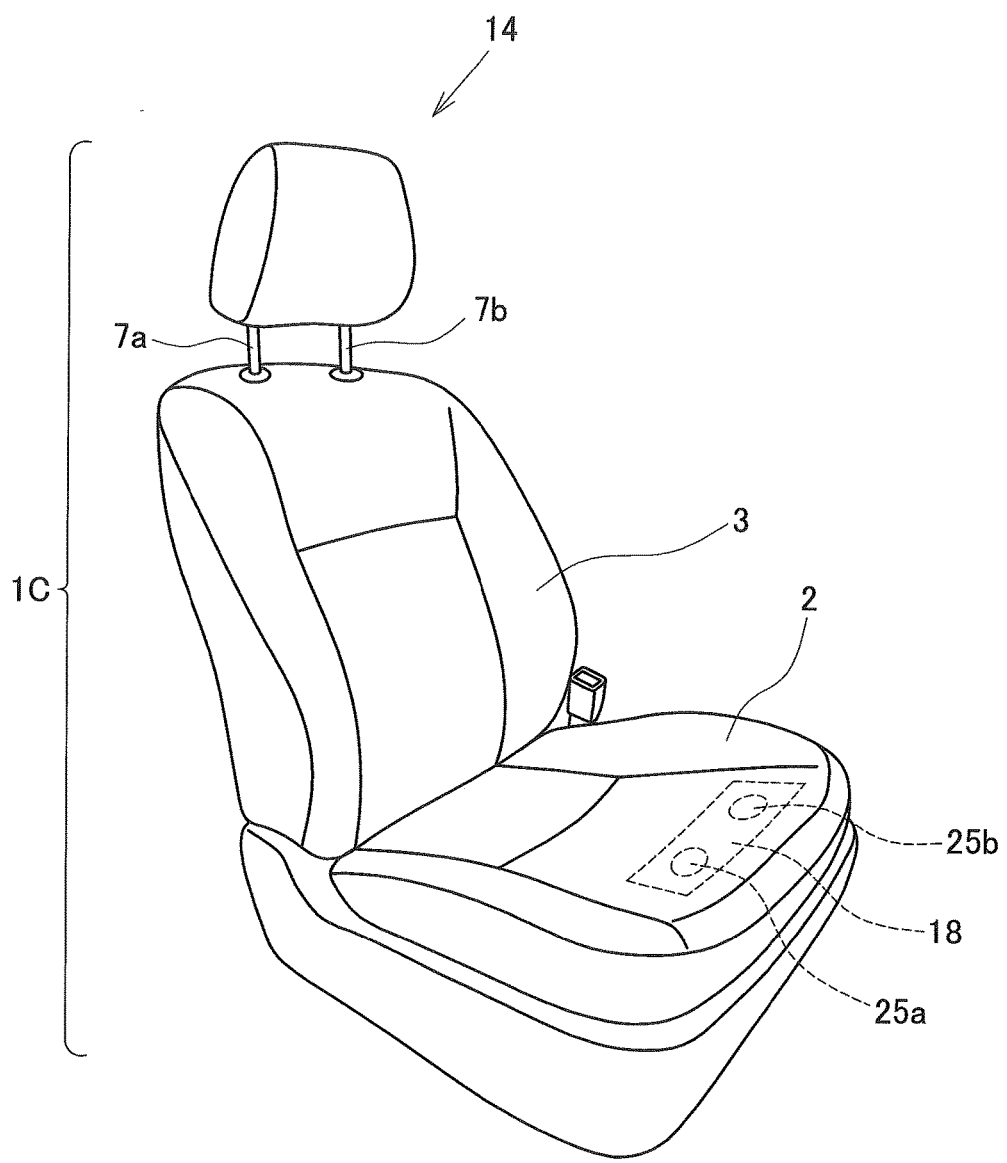
FIG. 11 is a perspective view of yet another embodiment of the vehicle seat according to the present invention.

FIG. 11 shows yet another embodiment of the vehicle seat according to the present invention. This vehicle seat 1C has speakers 25a, 25b and a duct structure 18 built into the interior of the distal-end part of the seat cushion 2. The duct structure 18 is the same as the duct structure 18 shown in, e.g., FIGS. 4, 5, and 6.

In the present embodiment, the headrest 14 may be the headrest 4A-4D shown in FIG. 1 (i.e., may have speakers and a duct structure), or may have no speakers built in.

In the present embodiment, a hard frame such as is used in conventional speaker grill structures is not used; instead, fiber pads 15 formed from non-hard three-dimensional-mesh-shape fiber pads and a non-hard sound-insulating pad 16 are employed. Therefore, it is possible to prevent an occupant in the vehicle seat 1C from experiencing discomfort of feeling hardness when touching the front surface of the seat back 3.

Additionally, the non-hard fiber pads 15 that can transmit sound and the sound-insulating pad 16 which is a non-hard elastic body are provided to the front surface of the speakers 25a, 25b; therefore, the speakers can be arranged in the immediate vicinity of the body (particularly the gluteal area or thigh area) of the occupant, or in the surface in contact with the body, whereby the vehicle seat 1C, which is a product, can be formed compactly.

Additionally, the three-dimensional-mesh-shape fiber pads used in the present embodiment are configured such that fiber-form resins are three-dimensionally intertwined, whereby multiple small interior spaces are retained in a dispersed state and sound-permeability is very high. This enhances the transmission of sound; as a result, the sound emitted from the speakers can be provided to the occupant without any decrease in the acoustic pressure and/or acoustic quality of the sound.

Additionally, according to the vehicle seat 1C of the present embodiment, directionality can be imparted to the sound emitted from the speakers 25a, 25b by the duct structure 18 (see FIG. 4) comprising the fiber pads 15 and the sound-insulating pads 16, 16a, 16b. Furthermore, the sound emitted from the speaker 25a and the sound emitted from the speaker 25b can be prevented from interfering with each other due to the sound-insulating pad 16; as a result, it is possible to retain high performance in regard to separating the sounds on the left and right.

Other Embodiments

The present invention is described above using preferred embodiments. However, the present invention is not limited to these embodiments; various modifications are possible within the scope of the invention described in the claims.

For example, in the embodiments described above, the seat back and the headrest are connected by pillar frames, as shown in FIGS. 1, 10, and 11. However, the configuration relating to the speakers of the present invention may instead be applied to the headrest portion or other portions of a high-back-seat-type vehicle seat in which the seat back and the headrest are integrally formed.

Additionally, in the embodiments described above, a description is given with respect to single-passenger individual seats for the driver and fellow passengers; however, as shall be apparent, the present invention can be applied to all of the seats in a vehicle; e.g., to the rear seats as well.

REFERENCE SIGNS LIST 1A, 1B, 1C. Vehicle seat, 2. Seat cushion, 3. Seat back, 4A, 4B, 4C, 4D. Headrest, 6. Core, 7a, 7b. Pillar frame, 8. Headrest frame, 9. Surface skin, 10. Front-side surface skin, 11. Rear-side surface skin, 14. Headrest, 15. Fiber pad, 16. Sound-insulating pad, 16a, 16b. Sound-insulating pad, 17. Elastic body, 18. Duct structure, 25a, 25b. Speaker, K1. Interior space, X0. Central axis, W0. Width of sound-insulating pad

The invention claimed is:

1. A headrest, comprising:
  a plurality of speakers;
  fiber pads provided to front surfaces of each of the speakers;
  a median sound-insulating pad provided between the fiber pads;
  outside sound-insulating pads provided on outer sides of the fiber pads; and
  a surface skin for covering the speakers, the fiber pads, and the sound-insulating pads,
  wherein the fiber pads include an elastic material that has a three-dimensional-mesh structure therein,
  wherein the sound-insulating pads include an elastic material for minimizing transmission of sound,
  wherein the fiber pads are filled into space formed by the median sound-insulating pad and the outside sound-insulating pads, and
  wherein the spaces formed by the median sound-insulating ad and the outside sound-insulating pads have shapes extending laterally in a direction from a location near the plurality of speakers toward a location away from the plurality of speakers.

2. The headrest according to claim 1, wherein the plurality of speakers are provided so as to be laterally divided in relation to a central axis of the headrest, the central axis extending vertically, and
  wherein the median sound-insulating pad is provided in a central region of the headrest, between the laterally divided plurality of speakers.

3. The headrest according to claim 1, wherein the surface skin for covering the fiber pads comprises a material that readily transmits the sound.

4. The headrest according to claim 3, wherein the surface skin includes a three-dimensional net material or a material containing a punched leather.

5. A vehicle seat, comprising:
  a seat cushion which includes a portion on which an occupant sits;
  a seat back which includes a portion with which a back of the occupant comes into contact; and
  a headrest which includes a portion with which a head of the occupant comes into contact, the headrest being mounted on the seat back,
  wherein the headrest includes the headrest according to claim 1.

6. A vehicle seat according to claim 5,
  wherein the headrest is the headrest according to claim 4.

7. A vehicle seat, comprising:
  a seat cushion which includes a portion on which an occupant sits;
  a seat back which includes a portion with which a back of the occupant comes into contact; and
  a headrest which includes a portion with which a head of the occupant comes into contact, the headrest being mounted on the seat back,
  wherein at least one of the seat back the seat cushion includes:
    a plurality of speakers;
    fiber pads provided to front surfaces of each of the speakers;
    a median sound-insulating pad provided between the fiber pads;
    outside sound-insulating pads provided on outer sides of the fiber pads; and
    a surface skin for covering the speakers, the fiber pads, and the sound-insulating pads,
  wherein the fiber pads include an elastic material that has a three-dimensional-mesh structure therein,
  wherein the sound-insulating pads include an elastic material for minimizing transmission of sound,
  wherein the fiber pads are filled into spaces formed by the median sound-insulating pad and the outside sound-insulating pad, and
  wherein the spaces formed by the median sound-insulating pad and the outside sound-insulating pads have shapes extending laterally in a direction from a location near the plurality of speaker toward a location away from the plurality of speakers.

* * * * *